US 8,112,795 B2
Feb. 7, 2012

(12) United States Patent
Saitoh

(10) Patent No.: US 8,112,795 B2
(45) Date of Patent: Feb. 7, 2012

(54) NON-CONTACT TYPE SEMICONDUCTOR DEVICE, MOBILE TERMINAL DEVICE, AND COMMUNICATION SYSTEM

(75) Inventor: Kei Saitoh, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1449 days.

(21) Appl. No.: 11/596,542

(22) PCT Filed: Dec. 20, 2005

(86) PCT No.: PCT/JP2005/023362
§ 371 (c)(1),
(2), (4) Date: Nov. 15, 2006

(87) PCT Pub. No.: WO2006/075485
PCT Pub. Date: Jul. 20, 2006

(65) Prior Publication Data
US 2007/0226501 A1    Sep. 27, 2007

(30) Foreign Application Priority Data
Jan. 11, 2005  (JP) .................................. 2005-004435

(51) Int. Cl.
*G06F 21/00* (2006.01)
(52) U.S. Cl. .............................. 726/9; 380/270; 713/170
(58) Field of Classification Search .................. 726/3, 4, 726/26, 27, 29, 30; 340/572.1; 235/435, 235/462.46, 472.02
See application file for complete search history.

(56) References Cited

U.S. PATENT DOCUMENTS

| 5,382,778 A * | 1/1995 | Takahira et al. ............. 235/380 |
| 5,686,920 A | 11/1997 | Hurta et al. |
| 7,031,946 B1 | 4/2006 | Tamai et al. |
| 2002/0073042 A1 * | 6/2002 | Maritzen et al. ................. 705/64 |
| 2004/0218436 A1 * | 11/2004 | Guthery ......................... 365/200 |
| 2005/0216746 A1 * | 9/2005 | Saika ............................. 713/182 |
| 2006/0200864 A1 | 9/2006 | Nakanishi et al. |
| 2008/0148349 A1 * | 6/2008 | Stevens et al. .................... 726/2 |

FOREIGN PATENT DOCUMENTS

| EP | 0 923 056 A2 | 6/1999 |
| EP | 1 205 405 A1 | 5/2002 |
| EP | 1 457 915 A1 | 9/2004 |
| JP | 2000-48141 | 2/2000 |
| JP | 2000-339420 | 12/2000 |
| JP | 2001-34729 A | 2/2001 |
| JP | 2001-257668 A | 9/2001 |

(Continued)

*Primary Examiner* — Gilberto Barron, Jr.
*Assistant Examiner* — David Le
(74) *Attorney, Agent, or Firm* — Birch, Stewart, Kolasch & Birch, LLP

(57) ABSTRACT

There are provided a non-contact type semiconductor device, a mobile terminal device, and a communication system capable of suppressing unauthorized read, thereby assuring security. The non-contact type semiconductor device records information for identifying a read device of a communication destination and a request from a read device in a recording area. Moreover, the non-contact type semiconductor device holds authentication information and access authority, requests the read device to send authentication information, correlates the authentication information with the authentication information and access authority held, and executes the request from the read device according to the correlation result. Furthermore, by performing mutual communication by using the read device, the non-contact type semiconductor device, and a mobile terminal device using the non-contact type semiconductor device, it is possible to suppress unauthorized read, thereby assuring security.

2 Claims, 10 Drawing Sheets

FOREIGN PATENT DOCUMENTS

| | | |
|---|---|---|
| JP | 2001-307055 A | 11/2001 |
| JP | 2002-175509 | 6/2002 |
| JP | 2002-211717 A | 7/2002 |
| JP | 2002-334306 | 11/2002 |
| JP | 2003-60748 A | 2/2003 |
| JP | 2003-316655 | 11/2003 |
| JP | 2004-295352 A | 10/2004 |
| JP | 2004-302710 A | 10/2004 |

* cited by examiner

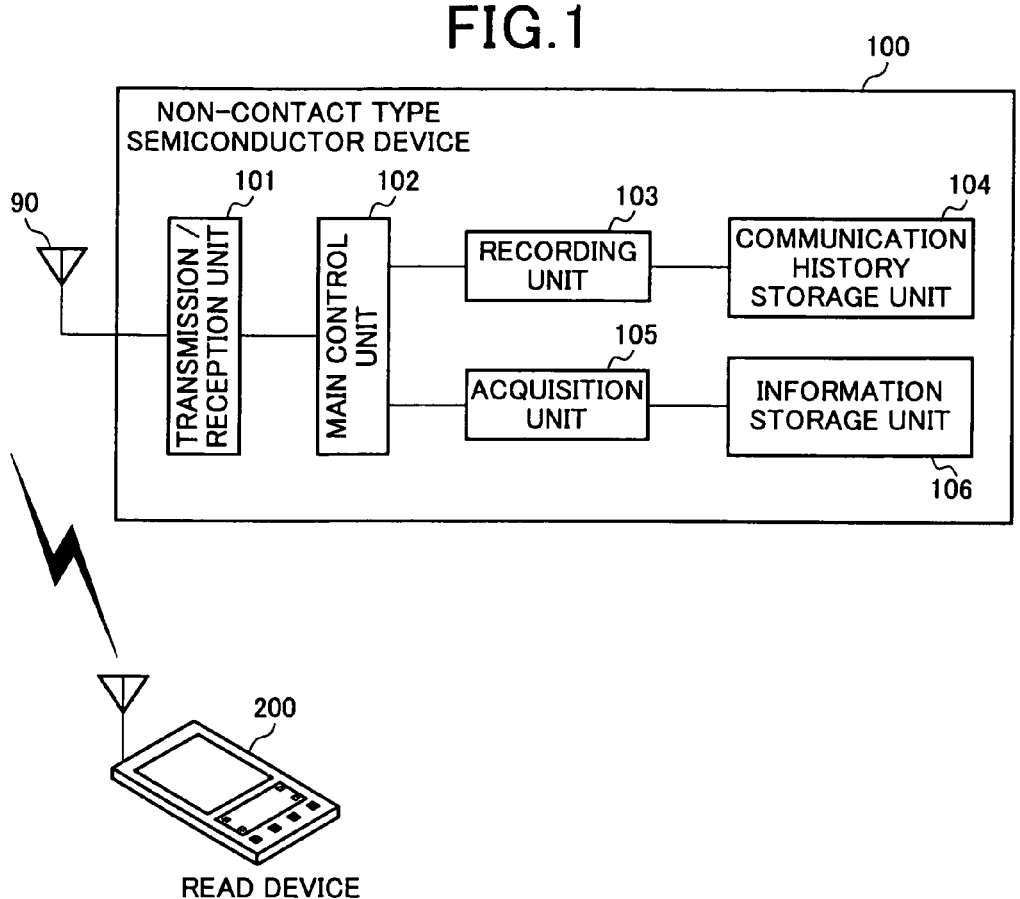

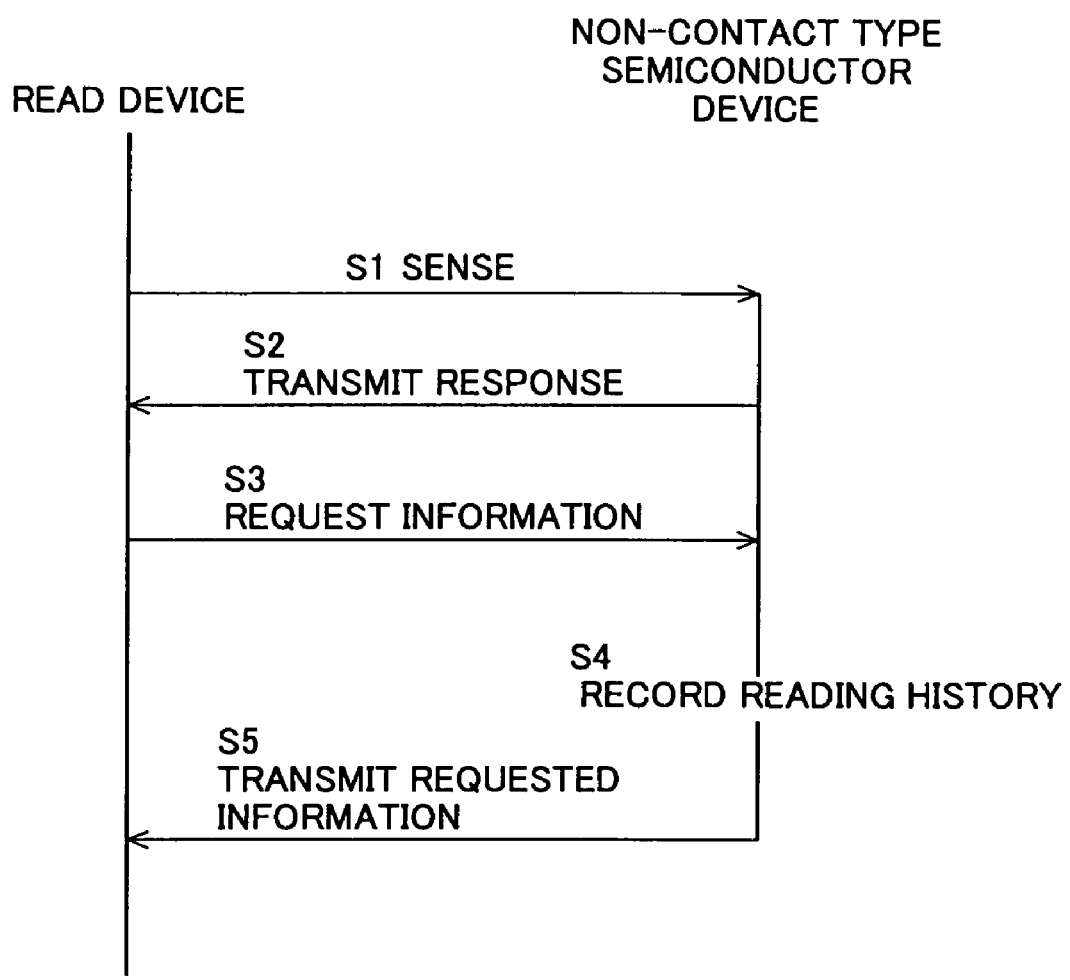

| AUTHENTICATING INFORMATION | ROOT | READ | WRITE |
|---|---|---|---|
| SUPER | ○ | ○ | ○ |
| SHOP | ○ | ○ | ○ |
| USER | × | ○ | × |

FIG.9

| IDENTIFYING INFORMATION | ROOT | READ | WRITE |
|---|---|---|---|
| FAC00001 | ○ | ○ | ○ |
| POS00001-01000 | ○ | ○ | ○ |
| 09001234567 | × | ○ | × |

NON-CONTACT TYPE SEMICONDUCTOR DEVICE, MOBILE TERMINAL DEVICE, AND COMMUNICATION SYSTEM

TECHNICAL FIELD

The present invention relates generally to a non-contact type semiconductor device, a mobile terminal device, and a communication system, and more particularly, to security control of information.

BACKGROUND OF THE INVENTION

A non-contact type semiconductor utilizing wireless communication has been started to be used in various uses. The non-contact type semiconductor internally holds various types of information, receives a request externally through the wireless communication, and executes processing according to a request. A typical non-contact type semiconductor can be, for example, the one called "wireless tag (RFID (Radio Frequency Identification) tag and IC tag)".

Wireless tags are tried to be attached to various articles, animals, plants, etc. The applicable scope of the wireless tag is not limited to areas such as improvement of efficiency of production and distribution, and various applied services that are available after the goods are delivered to consumers are contemplated.

The applicable scope of the wireless tag can include, for example, administration of prices, sell-by dates, etc., and administration of foods stored in refrigerators and best-before dates of foods in a supermarket by attaching the wireless tag to each of the goods therein; authentication at a train ticket wicket by attaching the wireless tag to each season ticket; and payment of tolls on a toll highway (ETC: Electronic Toll Collection).

Not only the cases where the wireless tag is attached to each of goods itself but also various services provided by applying a wireless tag attached to an apparatus such as a mobile phone are contemplated.

The wireless tag is applied to process control, parts inventory control, and product inventory control in a plant by attaching the wireless tag to each of parts handled therein; distribution control and inventory control that trace the distribution process and the inventory status by attaching the wireless tag to each of goods; library holdings management and lending/returning control in a library; etc.

Information recorded in a wireless tag can be read by an apparatus called "reader/writer" and this apparatus can write new information and change recorded information.

Therefore, though the wireless tag has an advantage that information is easily exchanged, a new threat to security, especially, a sense of threat to consumers for privacy invasion is getting strong.

Privacy invasion problems may be arisen that, for example, goods information of goods (for example, the prices of clothes that a person wears) is read in a store other than the supermarket where the person bought the goods and direct mail is sent to the person from an unknown store as to related goods based on the read information, that information on what a person threw away can be easily known to other persons when the person threw away items with wireless tags attached thereto in a dump, and that personal information such as the name of a person registered in a wireless tag that is attached to a members card is read. When personal information is read in a place that a person does not want other people to know that he/she has visited there, the case can be arisen that the information may be used for a malicious purpose such as blackmailing or sending reminders.

To solve the above problems, the technique in Patent Document 1 proposes an IC tag that can convert the encryption scheme of recorded data when necessary, an encryption scheme converting apparatus that transmits an encryption scheme conversion instruction to the IC tag, and a decrypting apparatus that decrypts information from the IC tag. Thereby, the IC tag can disclose necessary information to specific persons. However, the IC tag can keep confidentiality of the information against those other than the specific persons.

Patent Document 1: Japanese Laid-Open Patent Publication No. 2004-302710

DISCLOSURE OF THE INVENTION

Problems to be Solved by the Invention

However, according to a method of Patent Document 1 that uses encryption, when, for example, a decryption key is known, recorded data can be freely read and the person who is the subject matter of the information can not know that the information has been read.

Because the key for decryption is common, problems have arisen that access authority can not be changed for each read device and that writing can not be restricted.

The present invention has been made considering the above situation and the object thereof is to provide a non-contact type semiconductor device, a mobile terminal device, and a communication system that protect security by restraining reading from unauthorized read devices.

Means for Solving the Problems

To solve the above problems, the present invention employs the following configuration.

A non-contact type semiconductor device includes a transmission/reception unit that communicates by wireless with a read device and a storage unit that stores information that identifies the read device.

Specifically, the information that identifies the read device refers to authenticating information (an ID, a password), identifying information (a MAC address; the name, the serial number, etc., of an apparatus), or an ID set by an individual or a group.

The storage unit may store requests issued from the read device.

The non-contact type semiconductor device includes an authenticating information storage unit that stores authenticating information to authenticate a request origin and an information storage unit that stores data. The authenticating information storage unit stores either of the following.

Information that identifies a read device (the authenticating information, the identifying information).

Access authority corresponding to the identifying information.

The non-contact type semiconductor device includes a control unit that executes a request from the read device. The control unit executes a specified request when authentication is successfully completed with any one of the following or an arbitrary combination of the following.

(1) When the transmission/reception unit receives information that identifies the read device, an execution permission is given.

(2) Authenticating information is requested to the read device and the authentication is executed by comparing the authenticating information with the authenticating information storage unit.

(3) By referring to the authenticating information storage unit, it is judged whether access authority corresponding to information received by the transmission/reception unit that identifies a read device permits a request.

An authorized person can view and edit (adding, replacing, deleting, disposing, etc.) in the above authenticating information storage unit and the information storage unit when necessary.

The authenticating information storage unit has an area for which access authority can not be edited and, when the unit is disposed, the contents of the area are stored.

The above non-contact type semiconductor device may be attached to the mobile terminal device. In this case, not that a request from the read device is stored in the non-contact type semiconductor device, but the information that identifies the read device and the request may be stored in a recoding area that the mobile terminal device has.

When the non-contact type semiconductor device attached to the mobile terminal device can not authenticate a request from the read device or receives a request not within the scope of the access authority thereof, the apparatus may notify the mobile terminal device to the effect as above and the mobile terminal device may report the result externally by a displaying means, an emitting means, or a communicating means.

The present invention may be not only the above non-contact type semiconductor device or the mobile terminal device but also a mobile terminal device that incorporates the function of the read device together.

The above problem can be solved by a program that realizes the above functions exerted in the non-contact type semiconductor device and the mobile terminal device respectively having above configurations or a computer-readable recording medium recorded with the program.

By configuring the present invention as above, the following can be implemented.

(1) In the case where an item with a non-contact type semiconductor device attached thereto is thrown away, when a disposition process is executed, access authority of all read devices is cancelled and no person can read information.

Because an area that can not be rewritten is provided, only a read device of the manufacturer who is responsible for the item can read even when a disposition process is executed.

(2) By storing identifying information for a plurality of read devices on the reading side, access authority for the read devices stored in the non-contact type semiconductor device, etc., can be added and registered.

Thereby, for example, a read device of a cash register can read identifying information of a mobile terminal device and a refrigerator and can write the identifying information into a non-contact type semiconductor device, etc., attached to a food material and, thereby, food materials can be administered using the refrigerator only by putting food materials that are bought into the refrigerator.

(3) By storing on the reading side the type of an item that is attached with a non-contact type semiconductor device and identifying information of a read device that administers this item, the identifying information of a read device selected according to the type of the item can be added and registered to the non-contact type semiconductor device, etc., attached to the item.

For example, when a food material such as a vegetable is bought, identifying information of a refrigerator can be selected and registered and, when sanitary paper is bought, identifying information of a lavatory-consumables shelf can be registered.

Effect of the Invention

According to the present invention, reading from any unauthorized read device can be constrained and, therefore, security of information stored in a non-contact type semiconductor device or a mobile terminal device can be protected.

For example, by storing in a storage apparatus of a non-contact type semiconductor device itself or a storage apparatus of a mobile terminal device to which a non-contact type semiconductor device is attached to show which read device has read what information when information is requested from a read device, a containment effect is exerted on the reading side of a malicious third party.

Before transmitting information requested from a read device, authenticating information is requested to the read device and authentication is executed by comparing the authenticating information with authenticating information retained in advance and, thereby, security is improved.

Because access authority is adapted to be set for authenticating information, or identifying information for a specific read device, any request from a read device having no access authority can be eliminated and, thereby, security is improved.

BRIEF DESCRIPTION OF THE DRAWINGS

FIG. 1 is a functional block diagram of a non-contact type semiconductor device according to a first embodiment.

FIG. 2 is a data structure example of a reading history storage unit.

FIG. 3 is a flowchart of a flow of a process executed when a reading request of information from a read device is issued in the non-contact type semiconductor device according to the first embodiment.

FIG. 9 is an exemplary data of an authenticating information storage unit in a fourth embodiment.

EXPLANATION OF REFERENCE NUMERALS

Figure 4:
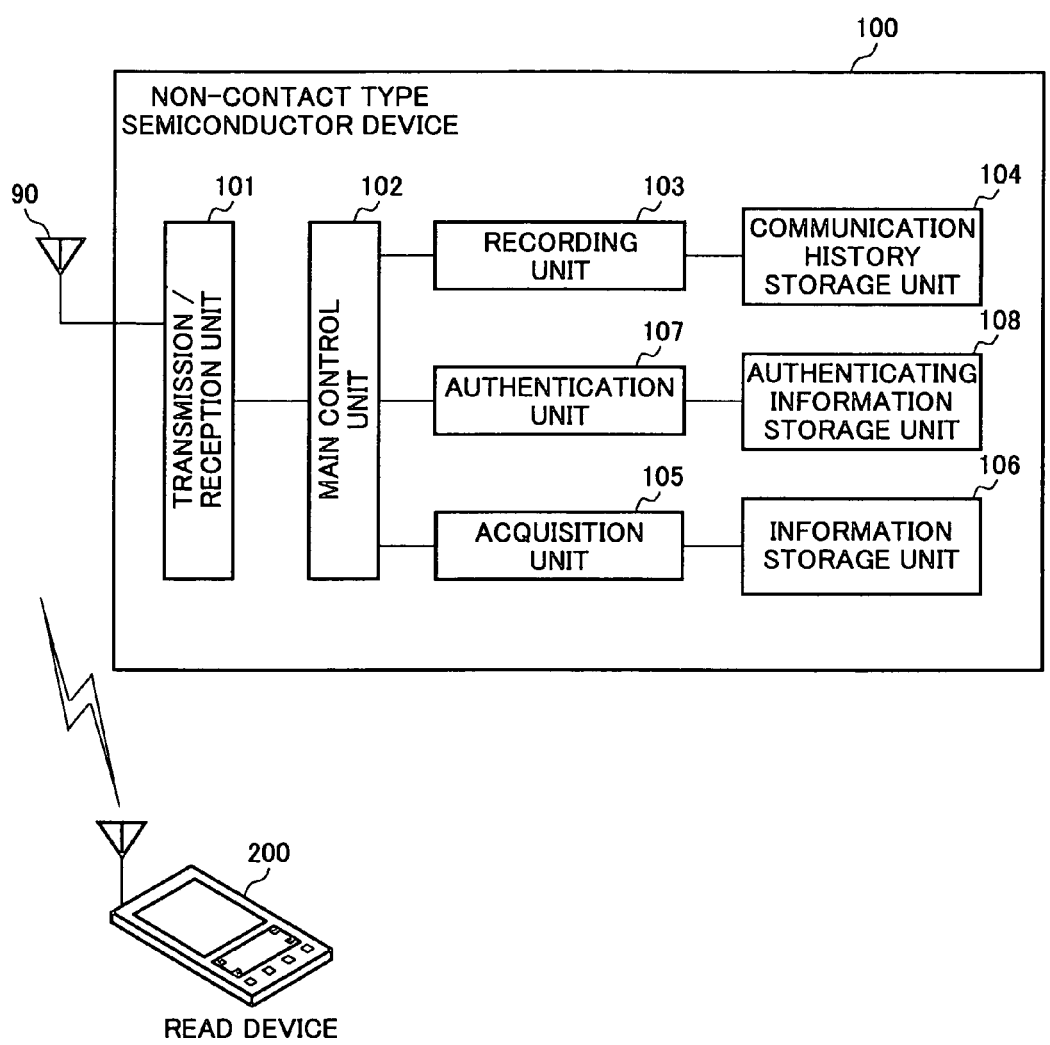
FIG. 4 is a functional block diagram of a non-contact type semiconductor device according to a second embodiment.

90 . . . antenna, 100 . . . non-contact type semiconductor device, 101 . . . transmission/reception unit, 102 . . . main control unit, 103 . . . recording unit, 104 . . . communication history storage unit, 105 . . . acquisition unit, 106 . . . information storage unit, 107 . . . authentication unit, 108 . . . authenticating information storage unit, 200 . . . read device, 300 . . . mobile terminal device, 301 . . . main control unit, 302 . . . antenna, 303 . . . wireless communication unit, 304 . . . storage unit, 305 . . . operation unit, 306 . . . display unit, 307 . . . speaker, 308 . . . microphone, 309 . . . non-contact type semiconductor device.

PREFERRED EMBODIMENTS OF THE INVENTION

Referring to the drawings, description will be given for preferred embodiments of a non-contact type semiconductor device, a mobile terminal device, and a communication system of the present invention.

It is assumed that a "non-contact type semiconductor device" of the present invention includes configurations of a single chip, a plurality of chips, or arbitrary combination of units and incorporates an information processing circuit, a memory circuit, a high frequency circuit, etc., and, thereby, can transmit by wireless various types of data including identifying information (an ID code) that identifies an individual and execute a program stored in the memory circuit using the information processing circuit.

According to the present invention, the transmission/reception unit and the storage unit may not be present in the chip and may be present on a substrate. The present invention also includes, for example, a mobile terminal device having no transmission/reception unit on a non-contact type IC chip but transmits and receives using a Felica antenna, a high frequency circuit, etc., on the mobile terminal device and a mobile terminal device utilizing a memory mounted on the mobile terminal device as a storage unit.

First Embodiment

FIG. 1 is a functional block diagram of a non-contact type semiconductor device according to a first embodiment of the present invention. In FIG. 1, a non-contact type semiconductor device 100 includes a transmission/reception unit 101, a main control unit 102, a recording unit 103, a communication history storage unit 104, an acquisition unit 105, and an information storage unit 106.

In the first embodiment, it is assumed that a wireless tag is attached to a commodity that an ordinary consumer buys and uses continuously, and is used for a long time and, therefore, description will be given assuming that the present invention is applied to a passive wireless tag having no battery, for which depletion of a battery does not need to be worried. However, the embodiment is not limited to the wireless tag and the present invention can be applied to any apparatus that has various types of information therein, receives a request externally by wireless communication, and executes processing according to the request. For example, the non-contact type semiconductor device includes a Bluetooth chip.

When the non-contact type semiconductor device 100 enters a communicable area where the device 100 can catch an induction magnetic flux radiated from a read device 200 using an antenna 90, induced electric power of the flux activates a semiconductor chip, and the chip can communicate with the read device 200 by wireless communication.

The transmission/reception unit 101 receives various types of requests and information from the read device 200 through the antenna 90 and delivers the requests and the information to the main control unit 102, and converts information and requests processed in units into an electromagnetic wave and transmits the wave toward the read device 200 through the antenna 90.

The main control unit 102 administers the overall control by operating a controlling program stored in the information storage unit 106.

The information storage unit 106 consists of a program area that stores the controlling program, a dedicated block that stores specific information of the non-contact type semiconductor device, and a variable block that stores information that a user can change. The dedicated block stores identifying information (an ID code) that identifies at least the non-contact type semiconductor device. The variable block stores, for example, identifying information of goods, information on the material, parts, etc., of the goods, prices of the goods, manufacture administering information, distribution administering information, or information of an individual that owns the non-contact type semiconductor device, etc. Because the variable block differs depending on how the non-contact type semiconductor device is used, the information to be stored therein is not limited to the above exemplified pieces of information.

The recording unit 103 causes the communication history storage unit 104 to store the identifying information of the read device delivered from the main control unit 102 (see FIG. 2(A)). The communication history storage unit 104 stores identifying information every time the unit 104 is requested to store from the read device.

The "identifying information of the read device" refers to information that is used to identify the read device and is, for example, a MAC address, the name of the apparatus, manufacture serial number, etc. The "identifying information of the read device" may be, in addition to the above information that is set in the apparatus in advance, an ID that a user can set later or a group ID representing a group made of a plurality of persons.

The communication history storage unit 104 may be caused to store not only the identifying information that is used to identify the read device but also the identifying information of the read device, whether reading or writing from the read device, and the name of information that is requested to be read or written, correlating those pieces of information with each other (see FIG. 2(B)).

When a reading request is issued from the read device 200, the acquisition unit 105 acquires the contents of information corresponding to a requested information name from the information storage unit 106 and responds through the main control unit 102 to the read device 200 that has issued the request. For example, when "prices of the goods" is requested as a requested information name, the acquisition unit 105 acquires information on the prices from an area that stores the "prices of the goods" of the information storage unit 106.

When the non-contact type semiconductor device is attached to an apparatus having an information processing unit and a storage unit (for example, a mobile communication terminal, a mobile telephone, etc.), this apparatus may have the communication history storage unit 104 and the recording unit 103 that writes histories into the unit 104.

FIG. 3 is a flowchart of a flow of a process executed when a reading request of information from the read device is issued in the non-contact type semiconductor device according to the first embodiment.

The read device 200 emits a sensing signal and is in a stand-by state (step S1).

When the transmission/reception unit 101 receives the sensing signal through the antenna 90, an internal circuit of the non-contact type semiconductor device 100 is activated and the main control unit 102 recognizes to be in a communicable area of the read device 200 and transmits a response signal indicating to be in a communicable state to the read device 200 through the antenna 90 (step S2).

When the read device 200 receives the response signal, the read device 200 transmits an "information request" command to the non-contact type semiconductor device 100 (step S3). The "information request" command is added with as parameters the identifying information of the read device and the name of the information that is requested to be read.

The main control unit 102 of the non-contact type semiconductor device 100 receives the "information request" command using the transmission/reception unit 101 and delivers the "identifying information of the read device" to the recording unit 103. The recording unit 103 accumulates the delivered "identifying information of the read device" in the communication history storage unit 104 and causes the unit 104 to store the accumulated information (step S4). Otherwise, the main control unit 102 may deliver the "identifying information of the read device" and "the name of the requested information" to the recording unit 103 and the recording unit 103 may accumulate the identifying information of the read device, distinction of whether reading or writing, and the name of the requested information in the communication history storage unit 104 and may cause the unit 104 to store those pieces of information correlating with each other.

The main control unit 102 delivers the name of the requested information to the acquisition unit 105. The acquisition unit 105 acquires the contents of the information corresponding to the name of the requested information from the information storage unit 106 and delivers the contents to the main control unit 102. The main control unit 102 adds the contents of the information delivered from the acquisition unit 105 to a "response" command and transmits the command from the transmission/reception unit 101 through the antenna 90 (step S5).

At this time, when the main control unit 102 judges that the received "information request" command does not include the "identifying information of the read device", the unit 102 accumulates the information request in the communication history storage unit 104 and causes the unit 104 to store the information request. However, the unit 102 does not execute any responding process. Otherwise, the unit 102 responds with a message such as "reading refused" as responding information.

Thereby, the read device 200 can acquire information that has been requested to be read.

According to the first embodiment, information leakage to any unknown read device can be prevented and, because the read device that requests reading and the contents thereof are accumulated and stored, the owner can know that an access from a malicious third party is made and this can be containment against a malicious third party.

Second Embodiment

In the above first embodiment, when the read device 200 side transmits at least the identifying information of the device 200 itself, the non-contact type semiconductor device 100 side reads and writes the requested information without any checking.

A second embodiment is adapted to check whether a read device is a read device that is permitted on the non-contact type semiconductor device side and, thereby, problems of security invasion are reduced.

FIG. 4 is a functional block diagram of a non-contact type semiconductor device according to the second embodiment of the present invention. In FIG. 4, the non-contact type semiconductor device 100 includes the transmission/reception unit 101, the main control unit 102, the recording unit 103, the communication history storage unit 104, the acquisition unit 105, the information storage unit 106, an authentication unit 107, and an authenticating information storage unit 108. The same components as those of FIG. 1 are denoted by the same reference numerals and the description will be given only for the points different from the first embodiment.

In the second embodiment, before using the non-contact type semiconductor device 100, authenticating information common to the read device 200 that reads information from the non-contact type semiconductor device 100 is acquired and the acquired authenticating information is set in the read device 200. The "authenticating information" is, for example, an ID, a password, etc. In the non-contact type semiconductor device 100, the acquired authenticating information and the identifying information of the read device are set in the authenticating information storage unit 108 correlating those pieces of information with each other.

For example, when shopping is executed in a store, a contract is made in advance with the operating company of electronic money that the store can handle, the amount of the electronic money and authenticating information (an ID, a password, etc.) are acquired, and the authenticating information and the identifying information of the read device are stored in the authenticating information storage unit 108 of the non-contact type semiconductor device 100 correlating those pieces of information with each other.

A consumer shops in the store having the non-contact type semiconductor device 100 with him/her.

After storing the identifying information of the read device or the name of the information that is requested to be read in the communication history storage unit 104, the main control unit 102 starts up the authentication unit 107.

The authentication unit 107 transmits an "authenticating information request" command to the read device 200 and, thereby, requests authenticating information on the reading side. When the authenticating information on the reading side is sent from the read device 200, the authentication unit 107 refers to the authenticating information storage unit 108; checks whether the sent authenticating information is registered as the authenticating information corresponding to the identifying information of the read device 200; when the same authenticating information is registered, returns authentication success to the main control unit 102; and, when the pieces of authenticating information are different from each other, returns authentication unsuccessfulness to the main control unit 102.

When the authentication is successful, the main control unit 102 delivers the name of the information requested from the read device 200 to the acquisition unit 105. When the authentication is unsuccessful, the main control unit 102 transmits a message to the effect as above to the read device 200.

When the request from the read device 200 is writing, only when the authentication is successful, the information is written into an area of the information storage unit 106 corresponding to the name of the information that has been requested to be written.

Figure 5:
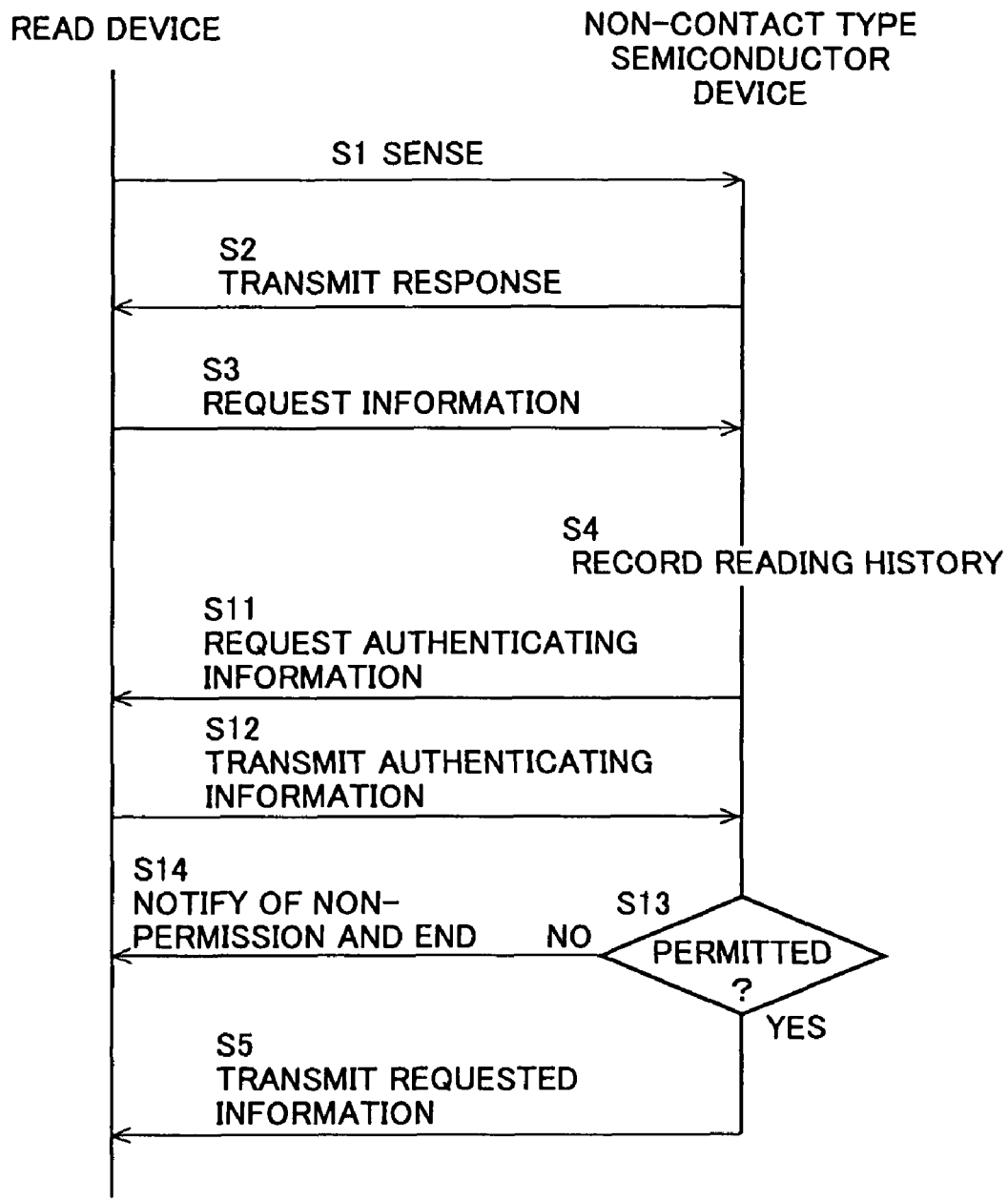
FIG. 5 is a flowchart of a flow of a process executed when a reading request of information from a read device is issued in the non-contact type semiconductor device according to the second embodiment.

FIG. 5 is a flowchart of a flow of a process executed when a reading request of information from the read device 200 is issued in the non-contact type semiconductor device according to the second embodiment. In FIG. 5, the same portions as those in FIG. 3 are given the same step numbers and the description thereof is omitted, and description will be given only for steps S11 to S14.

After accumulating and storing identifying information of the read device or the name of the requested information in the communication history storage unit 104 (step S4), the authentication unit 107 sends an "authenticating information request" command to the transmission/reception unit 101 and, thereby, requests authenticating information on the reading side (step S11).

When the authenticating information on the reading side is sent from the read device 200 (step S12), the authentication unit 107 refers to the authenticating information storage unit 108 and checks whether the sent authenticating information is registered as authenticating information corresponding to the identifying information of the read device 200 (step S13).

When the same authenticating information is not registered (step S13/NO), the authentication unit 107 transmits a message to the effect of authentication unsuccessfulness to the read device 200 (step S14) and ends the process.

When the read device 200 receives the message to the effect of the authentication unsuccessfulness, the read device 200 may indicate the reception by a displaying means, an emitting means, a communication means, etc.

When the same authenticating information is registered (step S13/YES), the authentication unit 107 first delivers the name of the information requested from the read device 200 to the acquisition unit 105 and transmits the contents of the requested information to the read device 200 (step S5).

Figures 6, 7:
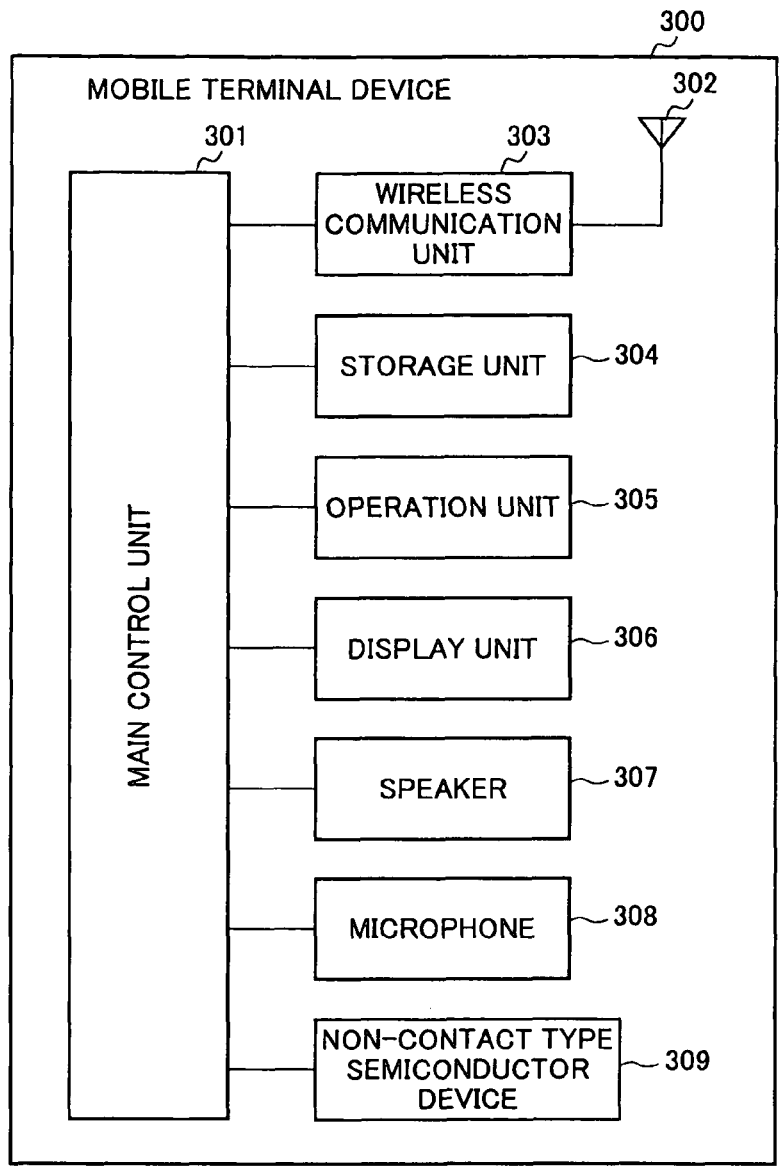
FIG. 6 is a configuration block diagram of a mobile terminal device according to the second embodiment.
FIG. 7 is an exemplary data of an authenticating information storage unit in a third embodiment.

Though the second embodiment has been described taking the example of the non-contact type semiconductor device having a one-chip configuration as above, the embodiment may be a mobile terminal device as shown in FIG. 6.

In FIG. 6, a mobile terminal device 300 includes a main control unit 301, an antenna 302, a wireless communication unit 303, a storage unit 304, an operation unit 305, a display unit 306, a speaker 307, a microphone 308, and a non-contact type semiconductor device 309.

The main control unit 301 controls the overall operation of the mobile terminal device 300 such as, for example, wireless communication, input/output control of operations and displays, input/output control of calls, and control of communication between read devices and the non-contact type semiconductor device 309, by executing a predetermined controlling program.

The wireless communication unit 303 executes wireless communication with other communication terminal apparatuses through the antenna 302 based on a predetermined communication scheme and, thereby, transmits/receives sound, characters, images, video data, etc. By the wireless communication, the wireless communication unit 303 can execute data communication such as audio telephone communication with a specific mobile telephone, etc., transmission/reception of electronic mail, viewing of contents on websites that provide information, and downloading of the contents.

The storage unit 304 includes, for example, a RAM (RandomAccess Memory), a ROM (Read Only Memory), a flash memory, an HDD (Hard Disk Drive), etc., and stores the controlling program executed by the main control unit 301, various types of application programs and data, and stores temporary data, etc., which are created during execution of the controlling program and the various types of application programs.

The operation unit 305 has buttons and switches to input telephone numbers, various functions, etc., and has a power source button, various data input buttons, and a multi-functional button, etc., to off-hook/on-hook to instruct to make a call, to end communication, etc., scroll to move a cursor upward, downward, to the left, and to the right, issue a connection instruction with the Internet, issue a use instruction of a function concerning electronic mail, issue a determination instruction of the contents displayed, etc. Every time a user operates any one of the buttons, which button is operated is notified of to the main control unit 301.

The display unit 306 includes, for example, a liquid crystal display, etc., and displays acquired information, data inputted by the operation unit 305, the intermediate state, the result, alarms during processing, etc.

The sound of conversation with a counterpart of a call is inputted from the microphone 308 and the inputted sound is compressed and encoded by sound-processing the inputted sound, and is transmitted from the wireless communication unit 303 through the antenna 302. Sound data received through the wireless communication unit 303 is converted into an analog sound signal by sound-processing the received data and is outputted to the speaker 307 for conversation and sound is released.

In the mobile terminal device 300 described above, those in the non-contact type semiconductor device 309 may be used as the communication history storage unit 104 and the authenticating information storage unit 108 that the above non-contact type semiconductor device 100 has or the storage unit 304 of the mobile terminal device 300 may be used. Similarly, those that the mobile terminal device 300 has may used as to the recording unit 103, the authentication unit 107, and the transmission/reception unit 101 that the above non-contact type semiconductor device 100 has.

Whether the identifying information of the read device is acquired, the authentication result by the authentication unit, the judgment result by a judging unit, etc., may be displayed on the display unit 306 of the mobile terminal device 300 or may be announced from the speaker 307 as phonetical information when a sound outputting unit is provided.

By configuring the second embodiment as above, before transmitting information requested from a read device, authenticating information is requested to the read device and the authenticating information is compared with authenticating information retained in advance. Therefore, the security is further protected.

Third Embodiment

Though same authority is given to all read devices having authenticating information in the above second embodiment, access authority to information is adapted to be controlled differently depending on authenticating information in a third embodiment.

The functional configuration of a non-contact type semiconductor device according to the third embodiment is same as that of the second embodiment and, therefore, the description will be given only for the points different from the second embodiment.

As shown in FIG. 7, access authority for each of one or more pieces of authenticating information is set in an authenticating information storage unit 108 in the third embodiment.

In an example in FIG. 7, it is assumed that a piece of authenticating information is an authenticating key word and "super", "shop", and "user" are used respectively for an administrator, a cash register on a store counter, and a customer.

Each of the pieces of authenticating information has access authority consisting of any one of "root", "read", and "write" or an arbitrary combination thereof. For the access authority, it is defined that "what request the authority retained by the read device enables" to the non-contact type semiconductor device.

In the example of FIG. 7, "root" specifies viewing of administering information (header information, etc.) of the authenticating information storage unit 108 and the presence or absence of the right for editing authority; "read" specifies the presence or absence of the right for reading authority of the information storage unit 106; and "write" specifies the presence or absence of the right for writing authority of the information storage unit 106. Being marked with "○" means having the right and "x" means having no right (invalid).

For example, in FIG. 7, when authenticating information is "super", the access authority has the right for all three of "root", "read", and "write" and, for the read device side, this means to have the editing authority of the authenticating information storage unit 108 of the non-contact type semiconductor device 100 and the reading/writing authority of the information storage unit 106. When the authenticating information is "user", this indicates to have only the reading authority of the information storage unit 106.

The access authority is not limited to those exemplified herein, and information to refer, edit, etc., is broken down and access authority for reading, writing, etc., may be set to pieces of the broken-down information respectively.

As to the settings of the authenticating information and the access authority in the read device and the non-contact type semiconductor device, a person who has the authority to set the above can execute addition, correction, and deletion thereof when necessary.

For example, a read device that can edit the access authority stored in the authenticating information storage unit of the non-contact type semiconductor device can execute registration and deletion of read devices that can read the information in the information storage unit.

The authentication unit 107 checks whether the authenticating information transmitted from the read device 200 is registered in the authenticating information storage unit 108. When the information is not registered, the authentication unit 107 returns a signal indicating authentication unsuccessfulness to the main control unit 102. When the information is registered, the authentication unit 107 refers to the authenticating information storage unit 108 and returns the access authority corresponding to the authenticating information transmitted from the read device 200 to the main control unit 102.

When the main control unit 102 receives the signal indicating the authentication unsuccessfulness, the unit 102 transmits a message to the effect of the unsuccessfulness to the read device 200.

When the main control unit 102 receives the access authority, the unit 102 checks whether the request of the read device 200 matches with the access authority. When the request matches, the main control unit 102 executes the request from the read device 200.

For example, when the request from the read device 200 is "reading of data" and the access authority has the right for the "read", the access authority is considered to be matched.

When the request does not match, the main control unit 102 transmits a message to the effect that the access authority is not matched to the read device 200 and does not execute the request.

For example, when the request from the read device 200 is "writing of data" and the access authority has no right for the "write", the access authority is considered to be unmatched.

To make the security more robust, information formed by converting the authenticating information based on an arbitrary rule may be delivered to a counterpart as an authentication keyword that is the authenticating information. For example, based on the identifying information specific to the apparatus of a counterpart to deliver information, the authenticating information is converted and delivered to the counterpart and, when authentication is executed, the identifying information specific to the apparatus of the counterpart is sent together and the authentication is executed.

By configuring as above, a request from a read device having no access authority can be eliminated and, therefore, security is further protected.

Description will be given for the case where encrypted DVD contents is bought in a store as an applied example of the third embodiment. In this example, the following is assumed.

(1) A non-contact type semiconductor device is attached to a commodity that contains the DVD contents. The non-contact type semiconductor device is recorded with identifying information, the type of the commodity, price information, and authenticating information, etc., used when these pieces of information are read by a cash register.

(2) A non-contact type semiconductor device attached to a mobile terminal device is recorded with electronic money and authenticating information used when the electronic money is paid.

(3) A read device provided for a cash register reads the commodity information and the price information from the non-contact type semiconductor device attached to the commodity; calculates the amount spent by the shopping; receives the payment using the electronic money recorded in the non-contact type semiconductor device attached to the mobile terminal device; delivers the decoding key for the DVD contents to the mobile terminal device; and records the decoding key into the mobile terminal device.

Figure 8:
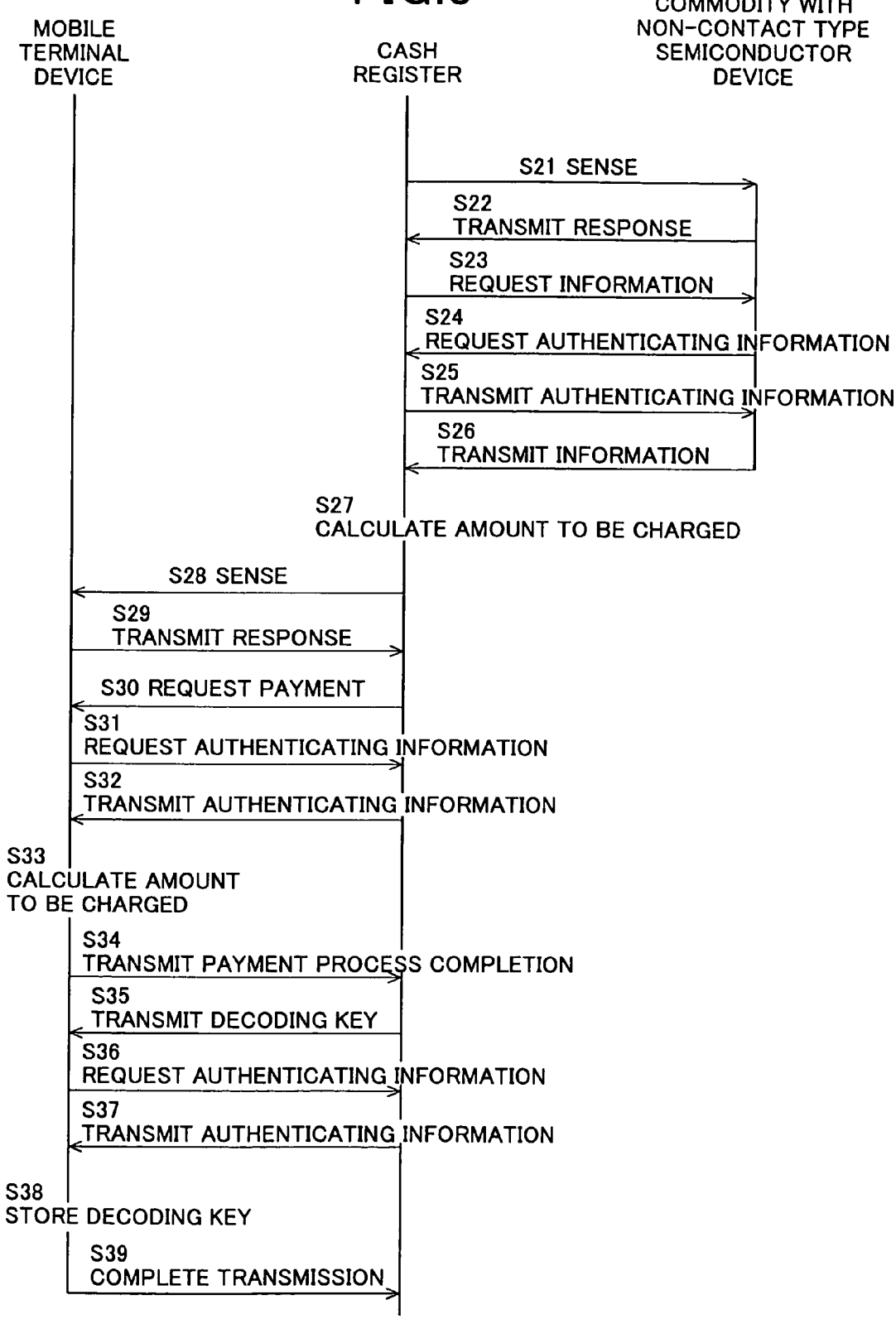
FIG. 8 is a flowchart for explaining a process in an applied example of the third embodiment.

Description will be given for the above operations of the apparatuses referring to the flowchart of FIG. 8.

The read device of the cash register emits a sensing signal and is in a stand-by state (step S21).

When the sensing signal is received through an antenna of the non-contact type semiconductor device attached to the commodity, an internal circuit of the non-contact type semiconductor device is activated and transmits a response signal indicating to be in a communicable state to the read device of the cash register (step S22).

When the read device of the cash register receives the response signal from the non-contact type semiconductor device attached to the commodity, the read device transmits an "information reading request" command (step S23). The "information reading request" command is added with parameters such as the "identifying information of the read device of the cash register", the name of the information that is requested to be read the "commodity information", the "price information", etc.

When the non-contact type semiconductor device pasted on the commodity receives the "information reading request" command, the device sends an "authenticating information request" command to the read device of the cash register (step S24).

When the authenticating information of the cash resister from the read device of the cash register is sent, the authenticating information of the cash register is stored in the authenticating information storage unit 108 and whether the access authority corresponding to the authenticating information of the cash register has the right for the "read" is checked (step S25).

When the right for the "read" is registered in the access authority, the non-contact type semiconductor device pasted on the commodity acquires from the information storage unit 106 the "commodity information" and the "price information" requested from the read device of the cash register and transmits those pieces of information to the read device of the cash register (step S26).

The cash register calculates the amount to be charged from the commodity information and the price information read (step S27) and the read device of the cash register emits the sensing signal and is in the stand-by state (step S28).

When the sensing signal is received by the mobile terminal device, the mobile terminal device transmits a response signal indicating to be in a communicable state to the read device of the cash register (step S29).

When the read device of the cash register receives the response signal, the device transmits a "payment request" command (step S30). The "payment request" command is added with parameters of "identifying information of the read device of the cash register" and the amount to be charged.

When the non-contact type semiconductor device attached to the mobile terminal device receives the "payment request" command, the device sends an "authenticating information request" command to the read device of the cash register (step S31).

When authenticating information of the cash register is sent from the read device of the cash register, the authenticating information of the cash register is stored in the authenticating information storage unit 108 and whether the access authority corresponding to the authenticating information of the cash register has the right for "write" is checked (step S32).

When the right for the "write" is registered in the access authority, the non-contact type semiconductor device withdraws the amount to be charged requested from the read device of the cash register from the electronic money of the information storage unit 106, updates the electronic money (step S33), and transmits a "payment process completion" to the read device of the cash register (step S34).

When the read device of the cash register receives the "payment process completion", the read device takes out a decoding key concerning the commodity and transmits the key to the non-contact type semiconductor device attached to the mobile terminal device (step S35).

When the non-contact type semiconductor device attached to the mobile terminal device receives the decoding key, the device sends an "authenticating information request" command to the read device of the cash register (step S36).

When the authenticating information of the cash register is sent from the read device of the cash register, the authenticating information of the cash register is stored in the authenticating information storage unit 108 and the non-contact type semiconductor device attached to the mobile terminal device checks whether the access authority corresponding to the authenticating information of the cash register has the right for the "write" (step S37).

When the right for the "write" is registered in the access authority, the device writes the decoding key into the information storage unit 106 (step S38) and transmits a "process completion" to the read device of the cash register (step S39). The received decoding key may not be stored in the non-contact type semiconductor device and may be stored in the storage unit of the mobile terminal device.

The user decodes the DVD contents using the decoding key acquired as above and can view the contents of the contents.

Fourth Embodiment

The authenticating information is caused to have the access authority in the above third embodiment. However, in a fourth embodiment, the access authority is adapted to be able to be registered and edited using a specific read device and, thereby, each read device can execute different access control.

The functional configuration of a non-contact type semiconductor device according to the fourth embodiment is same as that of the third embodiment and, therefore, the description will be given only for the points different from the third embodiment.

As shown in FIG. 9, in the authenticating information storage unit 108 of the fourth embodiment, each of read devices is identified with identifying information and access authority is set for each of the identified read devices. Though an apparatus ID is used as the identifying information for identifying a read device in the fourth embodiment, the identifying information may be any information that can identify uniquely a read device.

The example of FIG. 9 shows that, as the identifying information, an apparatus ID "FAC00001" is used for a read device used in a manufacturing factory to set access authority, etc., apparatus IDs "POS00001 to 01000" (representing serial numbers from "POS00001" to "POS01000") are used for read devices in cash registers installed in stores, and a telephone number "09001234567" is used for a mobile terminal device used to pay at the cash register counter.

As described above, the identifying information of the mobile terminal device is not limited to telephone numbers and a number may be used, that is formed by converting the telephone number according to an arbitrary rule (for example, a unidirectional hash using the identifying information specific to the apparatus), considering to be seen by a third party.

"root, read, write" indicating the access authority are same as those described referring to FIG. 7 for the third embodiment. As to the settings of these pieces of identifying information and the access authority, a person having authority to make the settings can execute addition, correction, and deletion to the settings when necessary.

Description will be given for the authentication unit 107 that has such an authenticating information storage unit.

The authentication unit 107 started up from the main control unit 102 checks whether identifying information transmitted from the read device 200 is registered in the authenticating information storage unit 108. When the information is not registered, the authentication unit 107 returns a signal indicating authentication unsuccessfulness to the main control unit 102. When the information is registered, the authentication unit 107 refers to the authenticating information storage unit 108 and returns to the main control unit 102 access authority corresponding to the identifying information transmitted from the read device 200.

When the main control unit 102 receives the signal indicating the authentication unsuccessfulness, the unit 102 transmits a message to the effect of the unsuccessfulness to the read device 200.

When the main control unit 102 receives the access authority, the unit 102 checks whether the request of the read device 200 matches with the access authority. When the request matches, the main control unit 102 executes the request from the read device 200.

For example, when the request from the read device 200 is "reading of data" and the access authority corresponding to the identifying information of the read device 200 has the right for the "read", the access authority is considered to be matched.

When the access authority does not match, the main control unit 102 transmits a message to the effect that the access authority is not matched to the read device 200, and does not execute the request.

For example, when the request from the read device 200 is "writing of data" and the access authority corresponding to the identifying information of the read device 200 has no right for the "write", the access authority is considered to be unmatched.

When the read device 200 includes a displaying means, an emitting means, or a communicating means, the read device 200 may report externally the authentication result using such a means.

By configuring the authenticating information storage unit as above, the counterpart of the communication can be limited to a specific read device and a request from a read device having no access authority can be eliminated. Therefore, security can be further protected.

Description will be given for the case where a house-hold account book for a commodity purchased in the following procedure is created as an applied example of the fourth embodiment.

(1) A user purchases a suit of Western clothes in a Western clothes department in a department store. The suit of Western clothes is attached with a non-contact type semiconductor device recorded with information on the type and the price of the commodity, and identifying information of a read device of a cash register, that reads the above information.

(2) A non-contact type semiconductor device attached to a mobile terminal device carried by the user (hereinafter, "mobile terminal device A") is recorded with electronic money, identifying information of a read device of a cash register, that issues a reading request when the electronic money is used to pay, and the access authority of the read device.

(3) The read device of the cash register reads the commodity information and the price information from the non-contact type semiconductor device attached to the suit of Western clothes, calculates the amount to be charged, receives the payment using the electronic money of the mobile terminal device A, and records the identifying information of the mobile terminal device A into the non-contact type semiconductor device attached to the suit of Western clothes.

(4) After the purchase, the user tries to read the information on the purchased commodity by bringing a mobile terminal device other than the mobile terminal device A (hereinafter, "mobile terminal device B") close to the commodity on the way home. However, the information can not be read because the identifying information of the mobile terminal device B is not registered.

(5) After coming home, the user reads the information recorded in the non-contact type semiconductor device attached to the suit of Western clothes using the mobile terminal device A and creates a house-hold account book using the price information.

Figure 10:
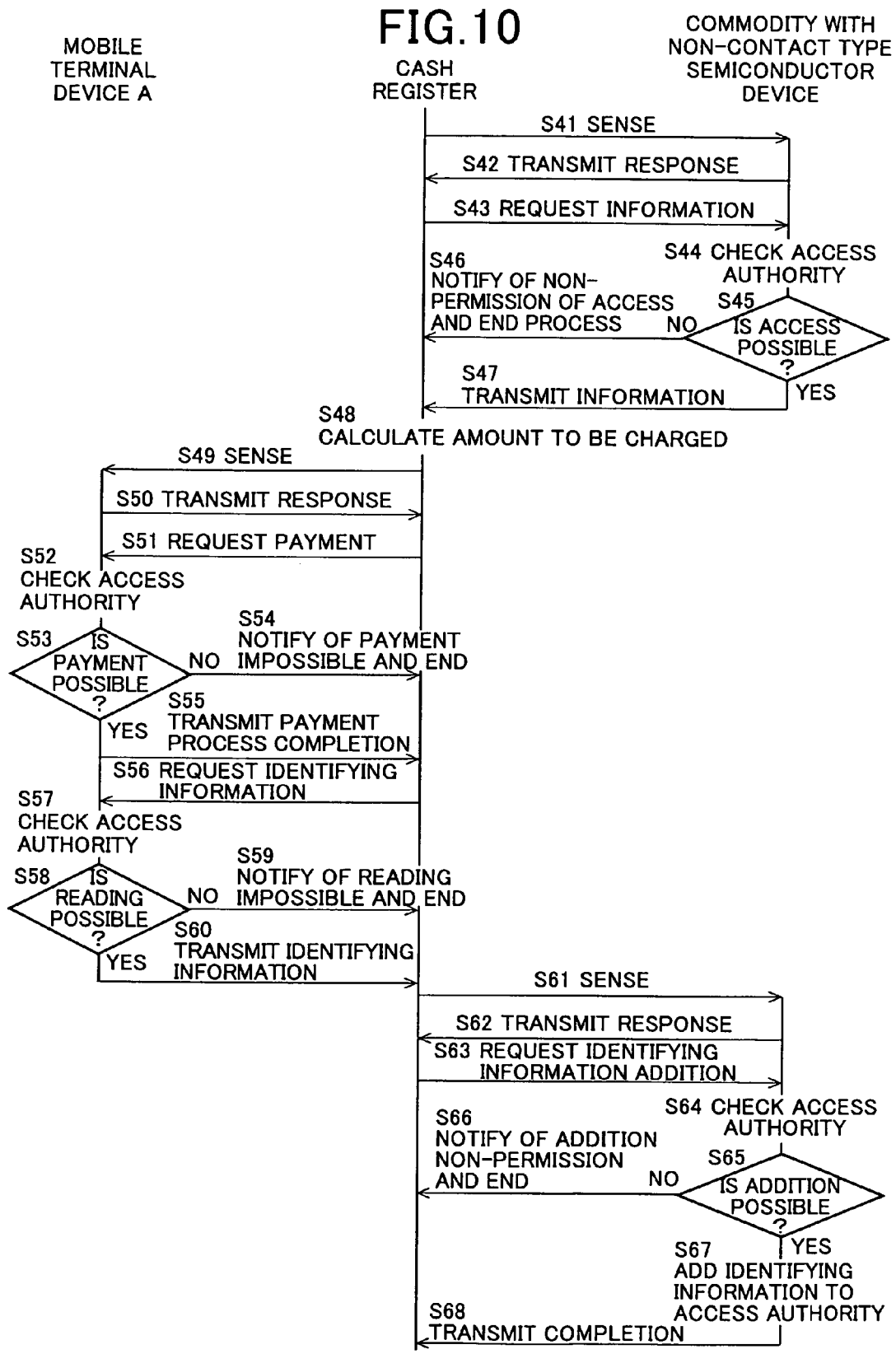
FIG. 10 is a flowchart (Part One) for explaining a process of an applied example of the fourth embodiment.

FIG. 10 is a flowchart of operations of each apparatus to the time when the user purchases the commodity.

The read device of the cash register emits a sensing signal and is in a stand-by state (step S41).

When the sensing signal is received through an antenna of the non-contact type semiconductor device attached to the commodity (the suit of Western clothes), an internal circuit of the non-contact type semiconductor device is activated and transmits a response signal indicating to be in a communicable state to the read device of the cash register (step S42).

When the read device of the cash register receives the response signal from the non-contact type semiconductor device attached to the commodity (the suit of Western clothes), the read device transmits an "information request" command (step S43). The "information request" command is added with parameters such as the "identifying information of the read device of the cash register", the name of the information that is requested to be read the "commodity information", the "price information", etc.

When the non-contact type semiconductor device attached to the commodity (the suit of Western clothes) receives the "information request" command, the device checks access authority (step S44).

The check of the access authority checks whether the "identifying information of the read device of the cash register" is stored in the authenticating information storage unit and the access authority corresponding to the "identifying information of the read device of the cash register" has the right for "read". When the access authority has the right for "read", an access is permitted and, otherwise, the access is not permitted.

When the "identifying information of the read device of the cash register" is not stored in the authenticating information storage unit or the access authority corresponding to the "identifying information of the read device of the cash register" is not permitted to be read (step S45/NO), the non-contact type semiconductor device transmits to the effect as "access not permitted" to the read device of the cash register and ends the process (step S46). The cash register that has received the "access not permitted" may report externally using a displaying means, an emitting means, a communicating means, etc.

When the checking of the access authority judges permission of the access (step S45/YES), the non-contact type semiconductor device acquires from the information storage unit the "commodity information" and the "price information" requested from the read device of the cash register and transmits those pieces of information to the read device of the cash register (step S47).

The cash register calculates the amount to be charged from the commodity information and the price information read (step S48). The cash register calculates the amount to be charged by receiving commodity information and price information for all commodities that have sent response signals at step S42 and totaling the prices.

When the read device of the cash register finishes the calculation of the amount to be charged, the read device emits the sensing signal and is in the stand-by state (step S49).

When this sensing signal is received by the non-contact type semiconductor device attached to the mobile terminal device A, the non-contact type semiconductor device transmits a response signal indicating to be in a communicable state to the read device of the cash register (step S50).

When the read device of the cash register receives the response signal from the non-contact type semiconductor device attached to the mobile terminal device A, the read device transmits a "payment request" command (step S51). The "payment request" command is added with parameters of "identifying information of the read device of the cash register" and the amount to be charged.

When the non-contact type semiconductor device attached to the mobile terminal device A receives the "payment request" command, the non-contact type semiconductor device checks access authority of the read device of the cash register (step S52).

The check of the access authority checks whether the "identifying information of the read device of the cash register" is stored in the authenticating information storage unit and the access authority corresponding to the "identifying information of the read device of the cash register" has the right for "write". When the access authority has no right for the "write", the payment is permitted and, otherwise, the payment is not permitted.

When the "identifying information of the read device of the cash register" is not stored in the authenticating information storage unit or when the access authority corresponding to the "identifying information of the read device of the cash register" has no right for the "write" (step S53/NO), the non-contact type semiconductor device transmits to the effect as "payment not permitted" to the read device of the cash register and ends the process (step S54). The cash register that has received the "payment not permitted" may report externally by a displaying means, an emitting means, a communicating means, etc.

When the checking of the access authority judges "payment permitted" (step S53/YES), the non-contact type semiconductor device withdraws from the electronic money of the information storage unit the amount to be charged requested from the read device of the cash register, updates the electronic money, and transmits "payment process completed" to the read device of the cash register (step S55).

When the read device of the cash register receives the "payment process completed", the device transmits a command to request the identifying information of the mobile terminal device A (step S56). This request command is added with "identifying information of the read device of the cash register".

When the non-contact type semiconductor device attached to the mobile terminal device A receives the request command, the device checks access authority of the read device of the cash register (step S57).

The check of the access authority checks whether the "identifying information of the read device of the cash register" is stored in the authenticating information storage unit and the access authority corresponding to the "identifying information of the read device of the cash register" has the right for "read". When the access authority has the right for the "read", the reading is permitted and, otherwise, the reading is judged not to be permitted.

When the "identifying information of the read device of the cash register" is not stored in the authenticating information storage unit or when the access authority corresponding to the "identifying information of the read device of the cash register" has no right for the "read" (step S58/NO), the non-contact type semiconductor device transmits to the effect that "reading of the identifying information is not permitted" to the read device of the cash register and ends the process (step S59). The cash register that has received the "reading of the identifying information is not permitted" may report externally by a displaying means, an emitting means, a communicating means, etc.

When the checking of the access authority judges "reading permitted" (step S58/YES), the non-contact type semiconductor device transmits the identifying information of the mobile terminal device A to the read device of the cash register (step S60).

When the read device of the cash register receives the identifying information of the mobile terminal device A, the read device emits a sensing signal and is in a stand-by state (step S61).

When the sensing signal is received through an antenna of the non-contact type semiconductor device attached to the commodity (the suit of Western clothes), the internal circuit of the non-contact type semiconductor device is activated and transmits a response signal indicating to be in a communicable state to the read device of the cash register (step S62).

The read device of the cash register transmits an "identifying information addition request" command to the non-contact type semiconductor device of the commodity (the suit of Western clothes) (step S63). The identifying information addition request command is added with the "identifying information of the read device of the cash register" and the received identifying information of the mobile terminal device A.

When the non-contact type semiconductor device attached to the commodity (the suit of Western clothes) receives the identifying information addition request command, the device checks access authority of the read device of the cash register (step S64).

This check of the access authority checks whether the "identifying information of the read device of the cash register" is stored in the authenticating information storage unit and the access authority corresponding to the "identifying information of the read device of the cash register" has the right for "root". When the access authority has the right for the "root", an addition to the identifying information is permitted and, otherwise, the addition is judged not to be permitted.

When the "identifying information of the read device of the cash register" is not stored in the authenticating information storage unit or the access authority corresponding to the "identifying information of the read device of the cash register" has no right for the "root" (step S65/NO), the non-contact type semiconductor device transmits to the effect as "addition to the identifying information not permitted" to the read device of the cash register and ends the process (step S66). The cash register that has received the "addition to the identifying information not permitted" may report externally by a displaying means, an emitting means, a communicating means, etc.

When the checking of the access authority judges "permission of the addition" (step S65/YES), the non-contact type semiconductor device adds to and records into the authenticating information storage unit the identifying information of the mobile terminal device A and the access authority (step S67) and transmits "process completed" to the read device of the cash register (step S68). The access authority of the mobile terminal device A that is added this time validates the right for the "root, read, and write" and the mobile terminal device A is handled as an administrator of the commodity.

The cash register adds identifying information of the mobile terminal device A for all commodities that have sent response signals at step S62.

Though, in the above description, the payment and the writing of the identifying information are executed together at one time when a plurality of commodities are purchased, the payment and the writing of identifying information may certainly be repeated for each one of all the purchased commodities.

Figure 11:
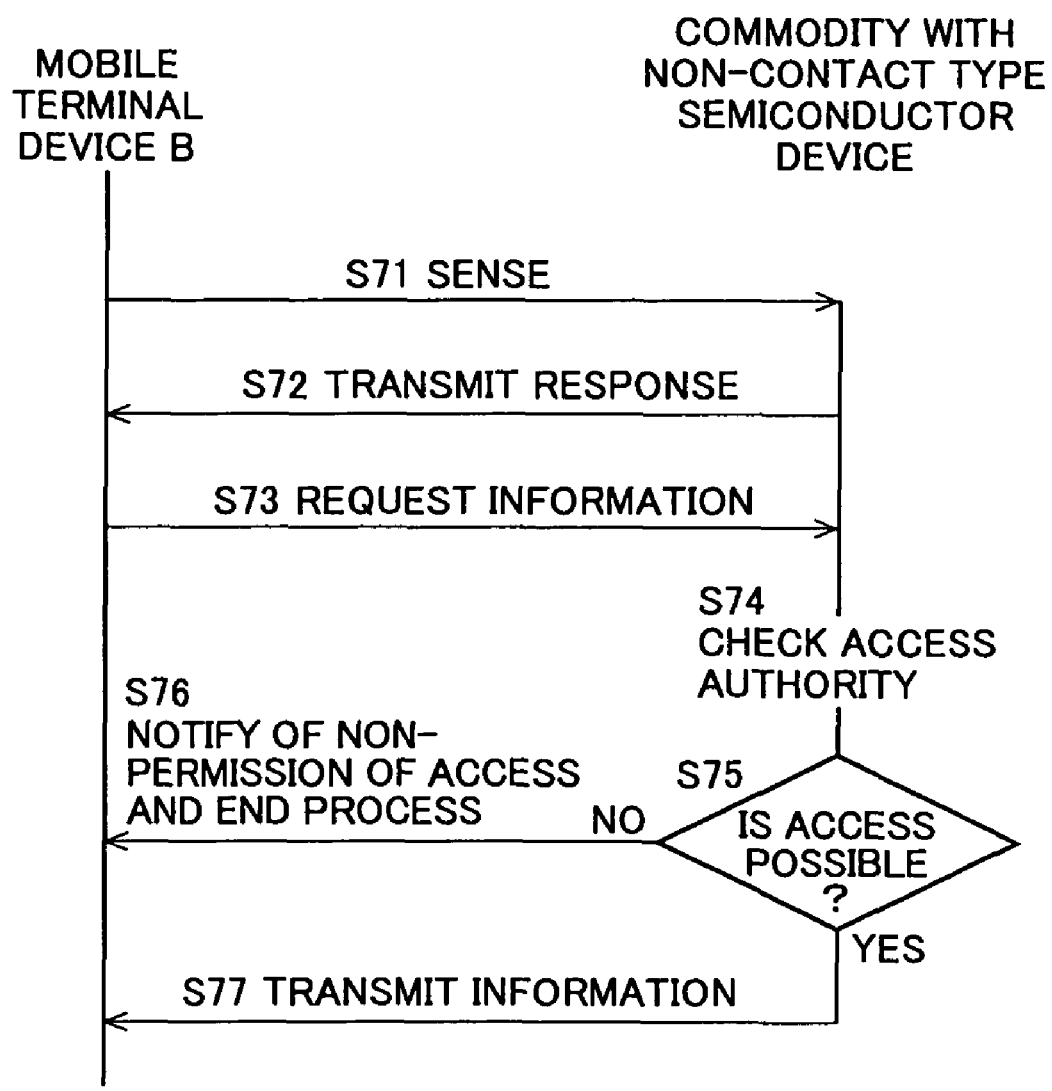
FIG. 11 is the flowchart (Part Two) for explaining the process of the applied example of the fourth embodiment.

FIG. 11 is a flowchart of operations executed when the mobile terminal device B other than the mobile terminal device A reads the information on the commodity.

On the way home after the purchase, the mobile terminal device B emits a sensing signal and is in a stand-by state (step S71).

When the sensing signal is received by the non-contact type semiconductor device attached to the commodity (the suit of Western clothes), the non-contact type semiconductor device transmits a response signal indicating to be in a communicable state (step S72).

When the mobile terminal device B receives the response signal from the non-contact type semiconductor device attached to the commodity, the device transmits an "information request" command (step S73). The "information request" command is added with as parameters "identifying information of the mobile terminal device B" and the name of the information that is requested to be read (for example, the "commodity information", the "price information", etc.). Otherwise, only the name of the information that is requested to be read is added as the parameter to be added to the "information request" command.

When the non-contact type semiconductor device attached to the commodity (the suit of Western clothes) receives the "information request" command, the device checks access authority of the mobile terminal device B (step S74).

This check of the access authority checks whether the "identifying information of the mobile terminal device B" is stored in the authenticating information storage unit and the access authority corresponding to the "identifying information of the mobile terminal device B" has the right for "read". When the access authority has the right for the "read", reading is permitted and, otherwise, the reading is not permitted.

When the "identifying information of the mobile terminal device B" is not stored in the authenticating information storage unit or the access authority corresponding to the "identifying information of the mobile terminal device B" has no right for the "read" (step S75/NO), the non-contact type semiconductor device transmits to the effect as "access to the specified information not permitted" to the mobile terminal device B and ends the process (step S76). The mobile terminal device B that has received the "access to the specified information not permitted" may report externally by a displaying means, an emitting means, a communicating means, etc.

When the checking of the access authority judges as "reading permitted" (step S75/YES), the non-contact type semiconductor device reads the specified information from the information storage unit and transmits the read information to the mobile terminal device B (step S77).

Figure 12:
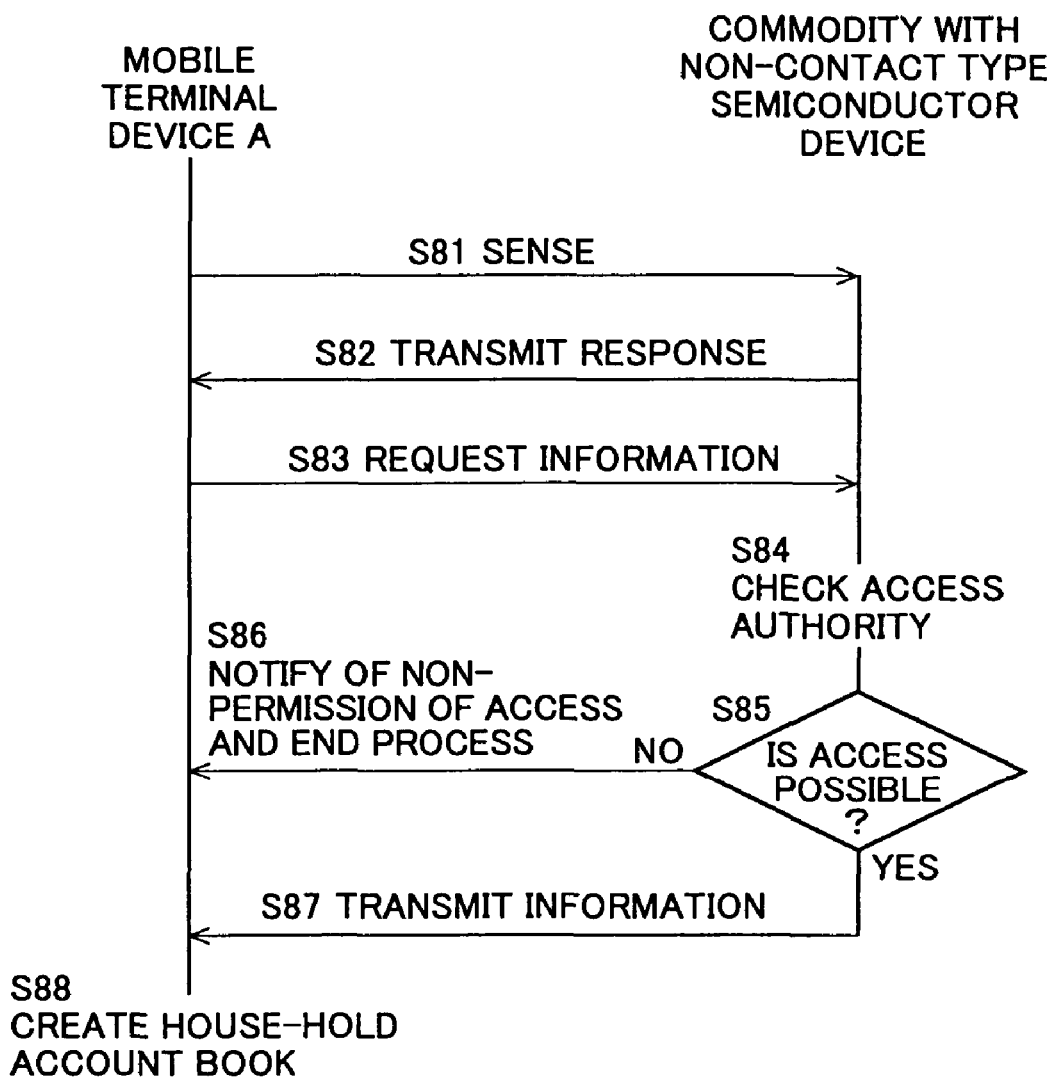
FIG. 12 is the flowchart (Part Three) for explaining the process of the applied example of the fourth embodiment.

FIG. 12 is a flowchart of operations executed when the house-hold account book is created.

To create the house-hold account book after coming home, the mobile terminal device A emits a sensing signal and is in the stand-by state (step S81).

When the sensing signal is received by the non-contact type semiconductor device attached to the commodity (the suit of Western clothes), the device transmits a response signal indicating to be in a communicable state to the mobile terminal device A (step S82).

When the mobile terminal device A receives the response signal from the non-contact type semiconductor device attached to the commodity, the device transmits an "information request" command (step S83). The "information request" command is added with parameters of the "identifying information of the mobile terminal device A" and the name of the information requested to be read "commodity information" and "price information".

When the non-contact type semiconductor device attached to the commodity (the suit of Western clothes) receives the "information request" command, the device checks access authority of the mobile terminal device A (step S84).

This check of the access authority checks whether the "identifying information of the mobile terminal device A" is stored in the authenticating information storage unit and the access authority corresponding to the "identifying information of the mobile terminal device A" has the right for "read". When the access authority has the right for the "read", reading is permitted and, otherwise, the reading is judged not to be permitted.

When the "identifying information of the mobile terminal device A" is not stored in the authenticating information storage unit or the access authority corresponding to the "identifying information of the mobile terminal device A" has no right for the "read" (step S85/NO), the non-contact type semiconductor device transmits to the effect as "access to the specified information not permitted" to the mobile terminal device A and ends the process (step S86). The mobile terminal device A that has received the "access to the specified information not permitted" may report externally by a displaying means, an emitting means, a communicating means, etc.

When this checking of the access authority judges "permission of the reading" (step S85/YES), the non-contact type semiconductor device acquires from the information storage unit the requested "commodity information" and the "price information" and transmits those pieces of information to the mobile terminal device A (step S87)

In this manner, the non-contact type semiconductor device reads the "commodity information" and "price information" for all commodities from which response signals have been received at step S82 and the mobile terminal device A creates the house-hold account book (step S88).

Other Embodiments

Though the non-contact type semiconductor device of the purchased commodity stores the access authority added with the identifying information of the mobile terminal device A in the fourth embodiment described above, the access authority of the cash register is not deleted. In this case the security is improved when the access authority of the cash register is deleted or the access authority is invalidated (in the above example, the "○" for the "root, read, and write" of the access authority is only changed to a "x").

The above function of the read device of the cash register may be caused to be held by the non-contact type semiconductor device attached to the mobile terminal device.

Description will be given for, for example, the case where a person "A" having the mobile terminal device A gives a suit of Western clothes that the person A has to a person B having another mobile terminal device B.

The mobile terminal device A acquires the identifying information of the mobile terminal device B as above and adds to and records into the authenticating information storage unit the identifying information and the access authority of the mobile terminal device B as an administrator to the non-contact type semiconductor device attached to the suit of Western clothes. The mobile terminal device A sends the identifying information of the mobile terminal device A to the non-contact type semiconductor device attached to the suit of Western clothes and, thereby, in the authenticating information storage unit, deletes the access authority of the mobile terminal device A or invalidates the all pieces of access authority.

Therefore, the information recorded in the non-contact type semiconductor device attached to the suit of Western clothes can not be read or written from the mobile terminal device A, however, can be read and written and the access authority also can be edited from the mobile terminal device B. Thereby, the person B has been given the suit of Western clothes from the person A.

When a suit of Western clothes, etc., is disposed of, various types of information stored in the non-contact type semiconductor device must be adapted to be unable to be operated by anybody.

Therefore, when the disposition is executed using a mobile terminal device of a person having administrator authority for executing the disposition, access authority corresponding to all pieces of identifying information stored in the non-contact type semiconductor device are deleted or the access authority is invalidated. For example, a "x" is given to all of "root, read, and write" of the access authority or the authenticating information storage unit that records the access authority is shifted into a clear state.

Only the read device of the manufacturer (maker) of the disposed item that is responsible for the disposed item may be adapted to be able to read even when the disposition is executed.

In this case, the access authority is registered in the authenticating information storage unit in a state where the access authority is readable (a "○" is set for "read") for the identifying information of the read device of the maker and only this region is adapted to be unable to be re-written or deleted even when the disposition is executed.

In the above embodiment, when the ownership of an item is transferred, access authority only corresponding to the identifying information of the mobile terminal device owned by a user to be transferred to is set in the non-contact type semiconductor device attached to the item.

However, a purchased item may be delivered to a family member or put in a refrigerator or a wardrobe and may be administered in each place.

In this case, in the above embodiment, the access authority of the identifying information of an apparatus at a place of administration must be set again for each transfer.

For example, it is assumed that the function of a read device is installed in a refrigerator in a house and administers items in the refrigerator. When a user comes home with food materials purchased in a supermarket, the user needs to register the identifying information of the refrigerator to non-contact type semiconductor devices of all the food materials using a mobile terminal device before putting the food materials in the refrigerator. Such a work becomes more complicated as the number of the food materials increases.

The type and the identifying information are stored in the non-contact type semiconductor device of the mobile terminal device being correlated with each other. The "type" refers to the type of an item bought and the "identifying information" refers to the identifying information of an apparatus that administers the item. As to this correlation, a plurality of correlations may be stored when necessary. For example, in the case of the above refrigerator, correlations as shown in the following table are stored.

TABLE 1

| Type | Identifying Information |
|---|---|
| Food Material | Identifying Information of a Refrigerator |
| Sanitary Paper | Identifying Information of a Lavatory-Consumables Shelf |
| Western Clothes | Identifying Information of a Wardrobe |
| Underwear | Identifying Information of a Chest of Drawers |
| Book | Identifying Information of a Bookshelf |
| . | . |
| . | . |
| . | . |

As described in the above embodiment, when the identifying information of a mobile terminal device used for shopping is registered into a non-contact type semiconductor device of a commodity by a cash register in a supermarket, the identifying information corresponding to the type of the commodity bought is simultaneously recorded.

For example, when the mobile terminal device is requested from the read device of the cash register to transmit the identifying information of the mobile terminal device, the mobile terminal device transmits not only the "identifying information of the mobile terminal device" but also identifying information corresponding to the type of a commodity. For example, when a user buys meat and vegetables, identifying information "identifying information of a refrigerator" corresponding to the type "food material" is transmitted; and, when the user buys sanitary paper, identifying information "identifying information of a lavatory-consumables shelf" corresponding to the type "sanitary paper" is also transmitted. The read device of the cash register records "identifying information of the mobile terminal device" and pieces of access authority respectively for "identifying information of the refrigerator" and "identifying information of the lavatory-consumables shelf" into a non-contact type semiconductor device attached to each commodity.

Thereby, only by putting the food materials in the refrigerator without doing anything else after coming home, the refrigerator can administer the food materials and the lavatory-consumables shelf can administer the sanitary paper.

In addition to the above correlation between the type and the identifying information, access authority given to the identifying information is adapted to also be recorded, and identifying information and the access authority corresponding to the identifying information are adapted to be simultaneously registered, thereby, meticulous access authority can be set.

In each of the embodiments, encryption is not executed in the communication with the read device. However, encrypted communication may be adapted to be executed for the communication with the read device and, thereby, security can be certainly made more robust.

In the above embodiments, the authentication is executed with the identifying information of the read device. However, the authentication may be executed with the identifying information of the non-contact type semiconductor device.

For example, a non-contact type semiconductor device may have identifying information to identify the device itself and may transmit the identifying information to a read device when the device starts communication with the read device.

The read device stores information to identify the non-contact type semiconductor device in the storage unit and, when the read device starts communication with the non-contact type semiconductor device, receives the identifying information of the non-contact type semiconductor device and compares the received identifying information of the non-contact type semiconductor device with the storage unit. When authentication is successful as the result of the comparison, the read device transmits an information reading request to the non-contact type semiconductor device.

BY configuring the read device and the non-contact type semiconductor device as above, when a person gives an item that he/she owns to a friend of his/hers, he/she only needs to transfer identifying information of the non-contact type semiconductor device of the item registered in his/her mobile terminal device to a mobile terminal device of the friend and, therefore, the process can be completed by communication between the mobile terminal devices.

The present invention is not limited to the above embodiments. Surely, the functions of the above embodiments may be represented as a program and the program may be written in advance into a memory of a non-contact type semiconductor device, a mobile terminal device, or a read device and the program written in the memory may be executed and, thereby, the object of the present invention can be achieved. In this case, the program itself read from the memory realizes the functions of the above embodiments and, therefore, the program and the memory recorded with the program also constitute the present invention.

The above program stored in a storing apparatus may be directly supplied from a server computer through a network.

In this case, the storing apparatus of the server computer is also included in the recording medium of the present invention.

By representing the functions of the above embodiments as a program and distributing the program in this manner, the cost can be reduced and the portability and the multi-purpose property can be improved.

The invention claimed is:

1. A communication system comprising a non-contact type semiconductor device attached to an item, a first read device that wirelessly communicates with the non-contact type semiconductor device, and a second read device provided for a mobile terminal that wirelessly communicates with the non-contact type semiconductor device, wherein the non-contact type semiconductor device comprises
   a transmission/reception unit that wirelessly communicates with the first read device or the second read device,
   an authenticating information storage unit that stores identifying information and authenticating information to identify either the first read device or the second read device being correlated with each other,
   an information storage unit that stores information read and written from either the first read device or the second read device,
   an authenticating unit that, when identifying information and authenticating information to identify either the first read device or the second read device that are received by the transmission/reception unit are stored in the authenticating information storage unit being correlated with each other, authenticates the first read device or the second read device, and
   a control unit that executes a request from either the first read device or the second read device that is authenticated by the authenticating unit, and
   wherein the first read device acquires data stored in the information storage unit of the non-contact type semiconductor device, transmits the data thus acquired to the mobile terminal as well as acquires identifying information and authenticating information of the portable terminal, and executes an editing process for adding reading authority of the information storage unit by at least the second read device to the authenticating storage unit of the non-contact type semiconductor device based on the identifying information and the authenticating information thus acquired.

2. The communication system as defined in claim 1, wherein a second non-contact type semiconductor device having an electronic money function, that wirelessly communicates with the first read device is attached to the mobile terminal, and the first read device executes a writing process into an information storage unit of the second non-contact type semiconductor device based on the data thus acquired.

* * * * *